US010677383B2

(12) United States Patent
Eichberger

(10) Patent No.: US 10,677,383 B2
(45) Date of Patent: Jun. 9, 2020

(54) MALE CONNECTOR FOR A COOLING PIPE AND A CONNECTION SYSTEM

(71) Applicant: SAMSUNG SDI CO., LTD., Yongin-si, Gyeonggi-do (KR)

(72) Inventor: Georg Eichberger, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 135 days.

(21) Appl. No.: 15/799,892

(22) Filed: Oct. 31, 2017

(65) Prior Publication Data

US 2018/0119861 A1 May 3, 2018

(30) Foreign Application Priority Data

Nov. 1, 2016 (EP) ..................................... 16196697

(51) Int. Cl.
*F16L 37/098* (2006.01)
*F16L 37/252* (2006.01)

(52) U.S. Cl.
CPC ........... *F16L 37/252* (2013.01); *F16L 37/098* (2013.01)

(58) Field of Classification Search
CPC ... F16L 37/025; F16L 37/098; F16L 37/0985; F16L 37/0987; F16L 37/12; F16L 37/133
See application file for complete search history.

(56) References Cited

U.S. PATENT DOCUMENTS

| | | | | | |
|---|---|---|---|---|---|
| 3,245,703 | A | * | 4/1966 | Manly | F16L 37/0847 285/319 |
| 3,328,054 | A | * | 6/1967 | Fecho | F16L 5/00 285/194 |
| 3,394,954 | A | * | 7/1968 | Sarns | A61M 39/10 285/319 |
| 4,610,468 | A | * | 9/1986 | Wood | F16L 37/0982 285/307 |
| 4,758,023 | A | | 7/1988 | Vermillion | |
| 5,171,164 | A | * | 12/1992 | O'Neil | H01R 13/745 174/660 |

(Continued)

FOREIGN PATENT DOCUMENTS

| | | |
|---|---|---|
| CN | 1662766 A | 8/2005 |
| CN | 103968173 A | 8/2014 |

(Continued)

OTHER PUBLICATIONS

Chinese Office Action, with English translation, dated Jan. 2, 2019, for corresponding Chinese Patent Application No. 201711057501.3 (18 pages).

(Continued)

*Primary Examiner* — David Bochna
(74) *Attorney, Agent, or Firm* — Lewis Roca Rothgerber Christie LLP

(57) ABSTRACT

A male connector for a cooling pipe is provided. The male connector includes a hollow cylindrical base having a first end having a chamfered outer circumferential edge and a second end. The base includes a circumferential notch adjacent to the first end and configured to receive an O-ring and an elastic pin integrally formed with and protruding from a surface of the base. An acute angle formed between the surface of the base and the elastic pin has a vertex pointing toward the first end of the base.

13 Claims, 5 Drawing Sheets

(56) References Cited

U.S. PATENT DOCUMENTS

| | | | | |
|---|---|---|---|---|
| 5,259,650 | A * | 11/1993 | Gnauert | E03C 1/0403 285/319 |
| 5,330,235 | A * | 7/1994 | Wagner | F16L 37/0985 285/320 |
| 6,213,996 | B1 * | 4/2001 | Jepson | A61J 1/2089 604/256 |
| 6,688,654 | B2 * | 2/2004 | Romero | F16L 37/0987 285/308 |
| 7,044,506 | B2 * | 5/2006 | Dong | F16L 37/098 285/319 |
| 7,878,553 | B2 * | 2/2011 | Wicks | A61M 39/105 285/272 |
| 2004/0087986 | A1 | 5/2004 | Ott | |
| 2006/0066100 | A1 | 3/2006 | Nakashima et al. | |
| 2006/0103133 | A1 | 5/2006 | Moretti et al. | |
| 2008/0036205 | A1 * | 2/2008 | Kojima | F16L 37/0985 285/319 |
| 2010/0225104 | A1 * | 9/2010 | Ully | F16L 37/098 285/81 |
| 2012/0001415 | A1 * | 1/2012 | Hensel | F16L 37/098 285/81 |
| 2014/0209074 | A1 | 7/2014 | Kahle et al. | |
| 2015/0233509 | A1 | 8/2015 | Tiberghien et al. | |
| 2016/0258565 | A1 | 9/2016 | Leys et al. | |
| 2017/0191594 | A1 * | 7/2017 | Sireude | F16L 37/098 |

FOREIGN PATENT DOCUMENTS

| | | | |
|---|---|---|---|
| CN | 104847992 A | 8/2015 | |
| CN | 105745483 A | 7/2016 | |
| DE | 19644337 A1 * | 4/1998 | ........... F16L 37/098 |
| DE | 10 2009 035 222 A1 | 2/2010 | |
| EP | 2405173 A2 | 1/2012 | |
| FR | 2795803 A1 * | 1/2001 | .......... F16L 37/0985 |
| FR | 2909715 A1 | 6/2008 | |
| JP | 7-12797 Y2 | 3/1995 | |
| JP | 2006-90493 A | 4/2006 | |
| JP | 2008-8435 A | 1/2008 | |
| JP | 2009-250273 A | 10/2009 | |
| KR | 10-2015-0030931 | 3/2015 | |
| WO | WO 2004/040185 A1 | 5/2004 | |
| WO | WO-2018019422 A1 * | 2/2018 | .......... F16L 37/0985 |

OTHER PUBLICATIONS

European Search Report in corresponding European Application No. 16196697.3-1754, dated Apr. 18, 2017, 6 pages.

Chinese Patent Second Office Action with English Translation for corresponding Chinese Patent Application No. 201711057501.3, dated Jun. 13, 2019 and the accompanying Chinese Search Report dated Jun. 4, 2019, 16 pages.

EPO Office Action dated Apr. 7, 2020, for corresponding European Patent Application No. 16196697.3 (5 pages).

\* cited by examiner

MALE CONNECTOR FOR A COOLING PIPE AND A CONNECTION SYSTEM

CROSS-REFERENCE TO RELATED APPLICATION

This application claims priority to and the benefit of European Patent Application No. 16196697.3, filed on Nov. 1, 2016 in the European Patent Office, the disclosure of which is incorporated herein by reference in its entirety.

BACKGROUND

1. Field

Aspects of embodiments of the present invention relate to a male connector for a cooling pipe and a connection system.

2. Description of the Related Art

Cooling pipes are used to cool a large variety of different appliances. Many of these appliances are arranged in a housing adapted to receive a cooling pipe from a cooling system to provide a fluid to the housing or to an internal cooling pipe system of the housing.

Generally, a cooling pipe is connected to a housing or to an internal cooling pipe system of the housing via a cooling interface connector by screws.

For such a connection, the housing is often machined separately from the connector, which additionally includes bushings for the screw connection. This causes additional effort during the manufacturing process and increases the cost of the cooling system.

SUMMARY

One or more drawbacks of the prior art may be avoided or at least reduced or mitigated by embodiments of the present invention. For example, a male connector for a cooling pipe is provided. The male connector includes a hollow cylindrical base having a first end, a second end, and a circumferential notch adjacent to the first end to receive an O-ring. The first end is a chamfered outer circumferential edge of the base. According to embodiments of the present invention, the base includes an elastic pin that is integrally formed with a surface of the base. The elastic pin protrudes from the surface of the base in a direction such that an acute angle formed between the surface of the base and the elastic pin has a vertex that points toward the first end of the base and the opening of the acute angle points toward the second end of the base.

For the connection of such a male connector with a housing or with an internal cooling pipe system of a housing, no screws are needed because the elastic pin acts as a barb, preventing the male connector from being accidentally or unintentionally released (or disconnected) from a female connector of the housing or of the internal cooling pipe system of the housing. Therefore, a male connector according to embodiments of the present invention eases the connection of a cooling pipe with a housing or with an internal cooling pipe system of a housing and reduces the manufacturing costs of a male connector.

In some embodiments, the circumferential notch is between the elastic pin and the chamfered outer circumferential edge along a length direction of the base. In such embodiments, the male connector provides a sealed connection with a female connector of a housing or an internal cooling pipe system of a housing because an O-ring is arranged within the circumferential notch at the first end of the base of the male connector, which is inserted into the female connector before the elastic pin of the male connector engages a corresponding structure in the female connector.

In some embodiments, the acute angle ($\alpha$) formed between the surface of the base and the elastic pin may be in a range of about 5° to about 60°. For example, the acute angle ($\alpha$) may be equal to about 5°, about 10°, about 15°, about 20°, about 25°, about 30°, about 35°, about 40°, about 45°, about 50°, about 55°, or about 60°.

The elastic pin may be the residuum of a cut-out of the base of the male connector. The cut-out may have a saw kerf shape or a substantially saw kerf shape. The base, for example, the surface of the base, includes the cut-out that forms the elastic pin. In such embodiments, the manufacturing of the elastic pin is eased because it may be easily cut out of the surface of the base.

In some embodiments, the hollow cylindrical base has an inner radius $r_i$ and an outer radius $r_a$, and the cut-out of the base of the male connector has a depth d, the depth d being less than a thickness of base (e.g., $d<r_a-r_i$). In such embodiments, the cut-out does not intersect with (e.g., does not open to) the inner radius $r_i$ of the base, assuring that fluid flowing inside the male connector or the cooling pipe does not exit the male connector at the cut-out.

The elastic pin may have a substantially fin shape, such as a complanated fin shape, as an elastic pin having such a shape may be easily cut out of the surface of the base.

In some embodiments, the male connector includes a plurality of the elastic pins on opposite sides of the base (e.g., offset about 180° with respect to each other on the base about a central axis thereof). In such embodiments, the connection between the male connector and a corresponding female connector is very stable because, in a connected state, the male connector is connected to the female connector on two opposite sides of the base.

The male connector may further include an elastic T-shaped clip, such as an elastic, substantially elastic T-shaped clip, on the surface of the base. In such embodiments, the connection between the male connector and a female connector is further enhanced because the elastic T-shaped clip additionally engages a corresponding structure in the female connector.

In some embodiments, the elastic T-shaped clip includes a first arm extending along a first direction that is perpendicular to an axis of the base and a second arm extending along a second direction that is parallel to the axis of the base. Such elastic T-shaped clips may be easily actuated in order to release the male connector from a female connector.

Further, the second arm of the elastic T-shaped clip may extend along a direction that encloses an angle with the axis of the base.

The elastic T-shaped clip may be aligned with the elastic pin.

The male connector may include a plurality of elastic T-shaped clips or substantially T-shaped clips on opposite sides of the base. In such embodiments, the connection of the male connector with a female connector is stable because more than one elastic T-shaped clip on opposite sides of the base engage corresponding structures in a female connector. Furthermore, in such embodiments, the male connector may be released from the female connector via a pinch movement performable by, for example, two fingers of a human hand, concurrently actuating the elastic T-shaped clips.

Furthermore, a connection system for connecting a cooling pipe with a housing is provided. The connection system includes a male connector, such as those described above, and a housing having a female connector. The female connector includes a tube-shaped circular fit having an opening in a surface of the housing. The tube-shaped circular fit is adapted to receive a section of the base of the male connector. The circular fit has fixation opening adapted to engage the elastic pin of the male connector when the section of the base of the male connector is inserted into the female connector. With such a connection system, a stable connection between a cooling pipe and a housing or an internal cooling pipe system of the housing of an appliance may be provided.

In some embodiments, the fixation opening of the female connector and the elastic pin of the male connector form a snap-fit connection. For example, the fixation opening and the elastic pin are in the snap-fit connection when the section of the base of the male connector is inserted into the female connector. Snap-fit connections are strong connections which may be easily released. With such a connection system, no additional tools, such as, for example, screwdrivers, are needed to fix the male connector to the female connector of the connection system or to release it.

The circular fit may include a plurality of the fixation openings on opposite sides of the circular fit. In such embodiments, the elastic pins of the male connector may engage the fixation openings in the female connector, thereby forming a strong connection between the two elements.

Further, the surface of the housing may be a bearing surface for the elastic T-shaped clip of the male connector and may include a blocker adapted to engage the elastic T-shaped clip. The elastic T-shaped clip of the male connector may be adapted to engage the blocker on the bearing surface of the housing. For example, the elastic T-shaped clip and the blocker may be engaged when the connection system is in a connected state. In such embodiments, rotation of the male connector within the female connector is inhibited.

The blocker may include a plurality of protrusions adjacent to one another on the bearing surface with a gap to receive the elastic T-shaped clip therebetween. The protrusions may inhibit rotation of the elastic T-shaped clip with respect to the female connector when the elastic T-shaped clip and the blocker are in an engaged state. In such embodiments, the elastic T-shaped clip easily engages the blocker when the male connector is inserted into the female connector such that the elastic T-shaped clip is arranged in the gap between the protrusions.

In some embodiments, the female connector may be adapted to release the male connector when the elastic T-shaped clip is actuated and the male connector is rotated simultaneously (or concurrently). For example, the female connector may be adapted to release the male connector when the elastic T-shaped clip is actuated and the male connector is rotated relative to the housing simultaneously (or concurrently). In such embodiments, the male connector is safely connectable to the female connector of a housing and is easily releasable from the female connector at the same time.

The male connector may include an injection molded plastic or may be an injection molded plastic part. The female connector may include an injection molded plastic or may be an injection molded plastic part. The elastic pin and/or the elastic T-shaped clip may include an injection molded plastic or may be an injection molded plastic part. The blocker of the female connector may include an injection molded plastic or may be an injection molded plastic part. The circular fit of the female connector may include an injection molded plastic or may be an injection molded plastic part.

The male connector may include a metal or may be made of a metal. The female connector may include a metal or may be made of a metal.

In some embodiments, the elastic pin and/or the elastic T-shaped clip may be integrally formed with the male connector. Further, the elastic pin and/or the elastic T-shaped clip may form a part of the male connector.

Further aspects and features of the present invention will be learned from the dependent claims and/or the following description.

BRIEF DESCRIPTION OF THE DRAWINGS

Aspects and features of the present invention will become apparent to those of ordinary skill in the art by describing, in detail, exemplary embodiments thereof with reference to the attached drawings, in which.

DETAILED DESCRIPTION

Figure 1:
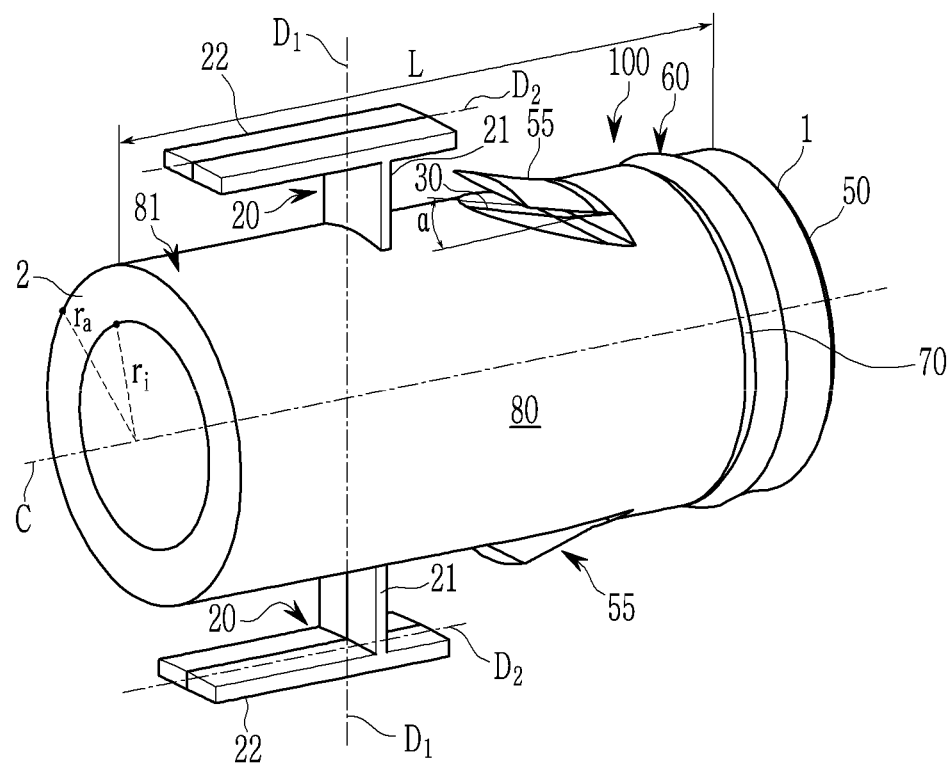
FIG. 1 is a perspective view of a male connector of a connection system according to an embodiment of the present invention.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

FIG. 1 is a perspective view of a male connector 100 for a cooling pipe according to an embodiment the present invention. The male connector 100 includes a hollow cylindrical base part 80 (e.g., a hollow cylindrical base) for the transport of a fluid. The male connector 100 has a first end 1 and a second end 2. The base part 80 has a tube shape or a substantial tube shape with a length L, an inner radius $r_i$, and an outer radius $r_a$. In FIG. 1, the second end 2 of the hollow cylindrical base part 80 is shown for the sake of simple illustration. However, the male connector 100 may be connected to or integrally connected to a cooling pipe or a tube. In some embodiments, the male connector 100 may be configured to be connectable to a cooling pipe or a tube via a further connector. The first end 1 of the male connector 100 has a circumferential notch 70 adjacent to a chamfered outer circumferential edge 50 of the base part 80 to receive an O-ring 60.

In the illustrated embodiment, the base part 80 includes two elastic pins 55 which are integrally formed with a surface 81 (e.g., an outer surface) of the base part 80 and arranged on opposite sides of the base part 80 (e.g., arranged at 180° with respect to each other about an axis of the base 80). However, according to other embodiments, a male connector may include only one elastic pin 55 or more than two elastic pins 55, for example, three, four, five, six, seven, eight, or more than eight elastic pins 55.

The elastic pins 55 protrude from the surface 81 of the base part 80 and form an acute angle α with the surface 81 of the base part 80. The acute angle α has a vertex 41 which points towards the first end 1 of the base part 80. For example, the elastic pins 55 protrude from the surface 81 of the base part 80 such that the acute angle α is formed with the surface 81 of the base part 80, and the acute angle α opens toward the second end 2 of the base part 80. In the illustrated embodiment, the circumferential notch 70 with the O-ring 60 therein is arranged between the elastic pins 55 and the chamfered outer circumferential edge 50 along the length L (e.g., along a length direction) of the base part 80.

In the illustrated embodiment, the elastic pins 55 of the male connector 100 are the residuum of cut-outs 30 of the base part 80 of the male connector 100. The cut-outs 30 have a saw kerf shape that is angled relative to the surface 81, leaving upper material of the base part 80 above the kerf—which represents a part of the surface 81 of the base part 80—as the elastic pins 55. Each elastic pin 55 is an elastic spring element having high mobility in a direction perpendicular to (e.g., normal to) the surface 81 of the base part 80 (e.g., perpendicular to or normal to the axis of the base part 80). The elastic pins 55 have a flattened fin shape protruding from (e.g., sticking out of) the surface 81 of the base part 80.

In the illustrated embodiment, the male connector 100 includes two elastic T-shaped clips 20 on opposite sides the surface 81 of the base part 80. In the illustrated embodiment, the male connector 100 includes two of the elastic T-shaped clips 20. However, according to other embodiments, a male connector may include only one elastic T-shaped clip 20 or more than two elastic T-shaped clips 20, for example, three, four, five, six, seven, eight, or more than eight elastic T-shaped clips 20.

Along the length L of the base part 80, the elastic pins 55 and the circumferential notch 70 are arranged between the elastic T-shaped clips 20 and the chamfered outer circumferential edge 50. Each elastic T-shaped clip 20 includes a first arm element 21 (e.g., a first arm) extending along a first direction D1 that is perpendicular to (e.g., normal to) a centerline C of the male connector 100 (e.g., an axis of the male connector 100) and a second arm element 22 (e.g., a second arm) extending along a second direction D2 that is parallel to the centerline C of the male connector 100. For example, each of the elastic T-shaped clips 20 includes two plates (e.g., the first and second arms) that together form an elastic T-shaped structure.

Figure 2:
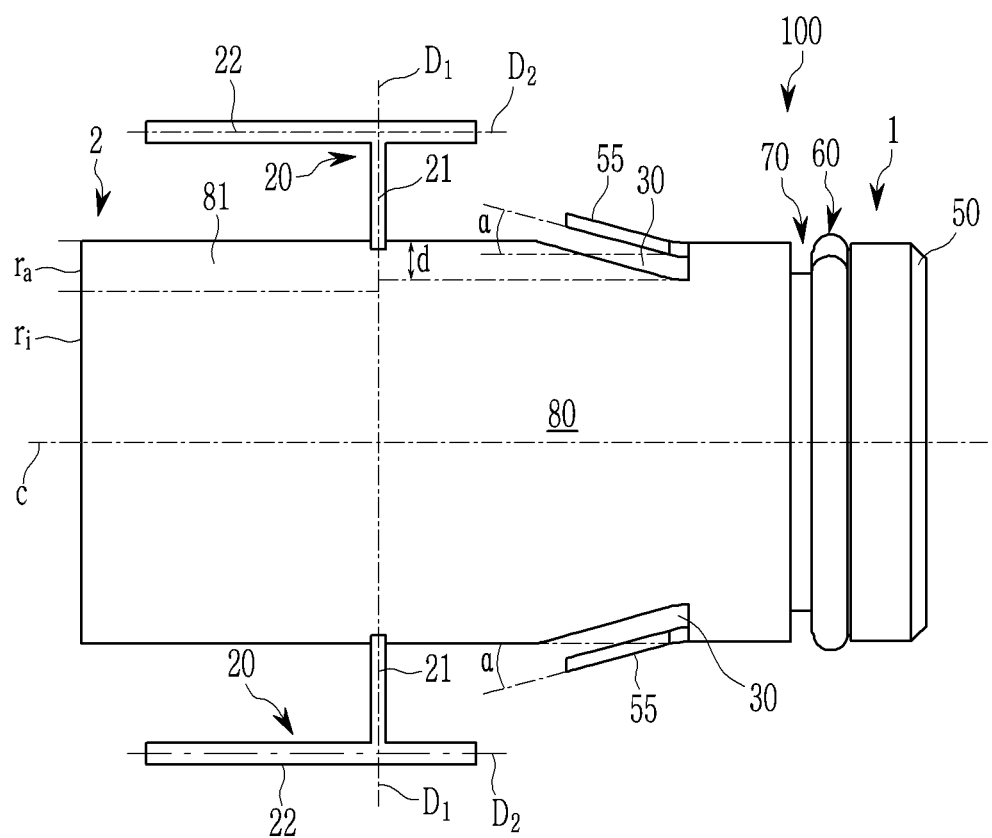
FIG. 2 is a side view of the male connector shown in FIG. 1.

FIG. 2 is a side view of the male connector 100 shown in FIG. 1. As can be seen in FIG. 2, the cut-outs 30 of the base part 80 of the male connector 100 have a depth d, wherein $d<r_a-r_i$. Therefore, the depth d of the cut-outs 30 does not intersect the inner radius $r_i$ of the base part 80 (e.g., the cut-outs 30 do not extend through the base part 80) so that a fluid within the male connector 100 cannot exit through the cut-outs 30.

Figure 3:
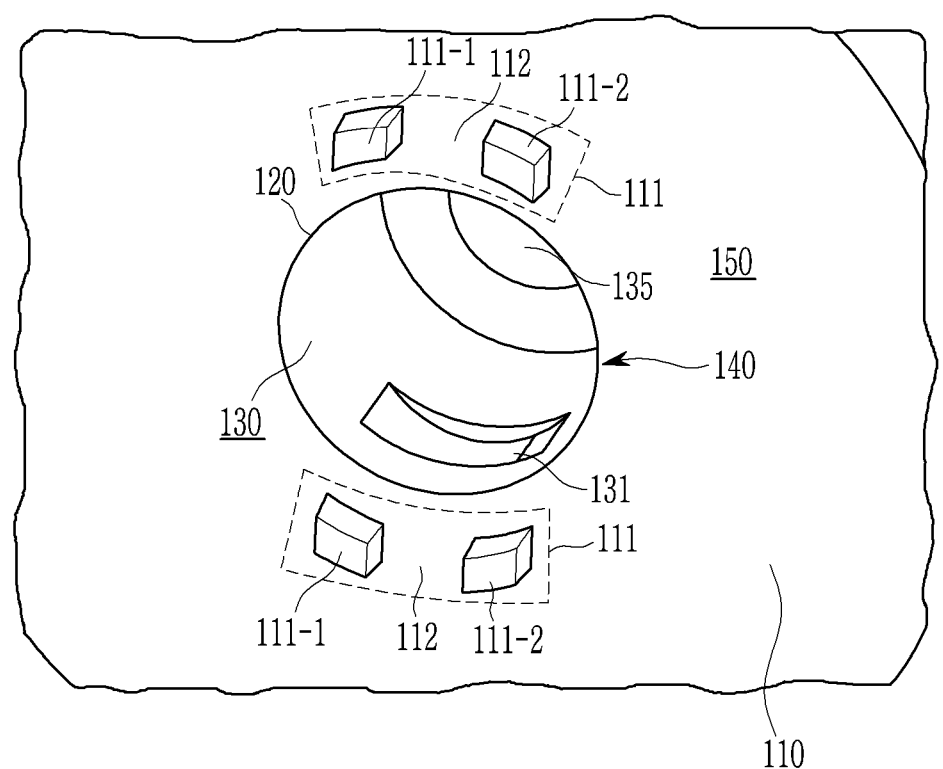
FIG. 3 is a perspective view of a female connector of the connection system according to an embodiment of the present invention.

FIG. 3 is a perspective view of a female connector 140 of a connection system 200 for connecting a cooling pipe with a housing 150 according to an embodiment of the present invention. The connection system 200 includes a male connector, such as the male connector 100 shown in FIGS. 1 and 2, and the housing 150 including the female connector 140. In the illustrated embodiment, the female connector 140 is formed in the housing 150 that, as an example, houses an appliance to be cooled. However, it is also possible to provide a connection system including a housing which only houses the components of the female connector 140. In the illustrated embodiment, the female connector 140 includes a tube-shaped circular fit 130 (e.g., a tube-shaped groove) with an opening 120 in a surface 110 of the housing 150. The circular fit 130 narrows into a connection pipe 135 having a radius which is smaller than a radius of the circular fit 130 and which, in the illustrated embodiment, is an end of an internal cooling system arranged within the housing 150.

The tube-shaped circular fit 130 is adapted to receive a section of the base part 80 of the male connector 100 shown in FIGS. 1 and 2 via the opening 120. In the illustrated embodiment, the circular fit 130 includes two fixation openings 131 (e.g., fixation holes or fixation grooves) on opposite sides of the circular fit 130 that are adapted to engage the elastic pins 55 of the male connector 100 when the section of the base part 80 of the male connector 100 is inserted into the female connector 140. One of the two fixation openings 131 is visible in FIG. 3 while the other fixation opening 131 is not visible due to the perspective of the female connector 140 in FIG. 3. In the illustrated embodiment, the circular fit 130 includes two fixation openings 131. However, according to other embodiments, a circular fit may include only one fixation opening 131 or more than two fixation openings 131, for example, three, four, five, six, seven, eight, or more than eight fixation openings 131. In addition, the number of fixation openings 131 may correspond to the number of elastic pins 55 of the male connector 100.

In the illustrated embodiment, the surface 110 of the housing 150 that has the opening 120 is a bearing surface for the elastic T-shaped clips 20 of the male connector 100 and includes two blockers 111 adapted to engage the elastic T-shaped clips 20 of the male connector 100 shown in FIGS. 1 and 2. The blockers 111 each include two protrusions 111-1, 111-2. The protrusions 111-1, 111-2 of each blocker 111 are arranged adjacent to one another on the bearing surface 110 of the housing 150 with a gap 112 therebetween to receive a corresponding one of the elastic T-shaped clips 20. In the illustrated embodiment, the housing 150 includes two blockers 111. However, according to other embodiments, a housing may include only one blocker 111 or more than two blockers 111, for example, three, four, five, six, seven, eight, or more than eight blockers 111. In addition, the number of blockers 111 may correspond to the number of elastic T-shaped clips 20 of the male connector 100.

Figure 4:
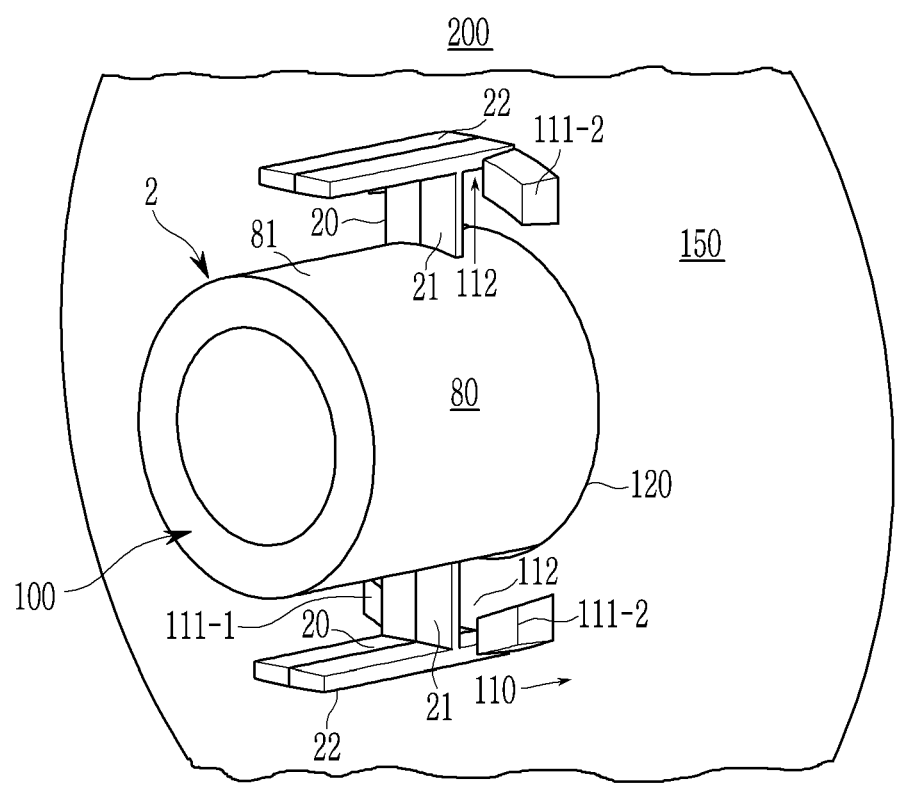
FIG. 4 is a perspective view of the connection system according to an embodiment of the present invention in a connected state.

FIG. 4 is a perspective view of the connection system 200 as shown in FIGS. 1-3 in a connected state. For example, FIG. 4 shows the female connector 140 shown in FIG. 3 with the male connector 100 shown in FIGS. 1 and 2 connected thereto. As can be seen in FIG. 4, the elastic T-shaped clips 20 of the male connector 100 contact the bearing surface 110 of the housing 150 via their respective second arm elements 22 when the connection system 200 is in the connected state. Further, the second arm elements 22 of the elastic T-shaped clips 20 are arranged within the gaps 112 of the blockers 111.

For example, the elastic T-shaped clips 20 of the male connector 100 are engaged with the blockers 111 such that the protrusions 111-1, 111-2 of the blockers 111 prevent the elastic T-shaped clips 20 and, therefore, the male connector 100, from rotating relative to the female connector 140.

Figure 5:
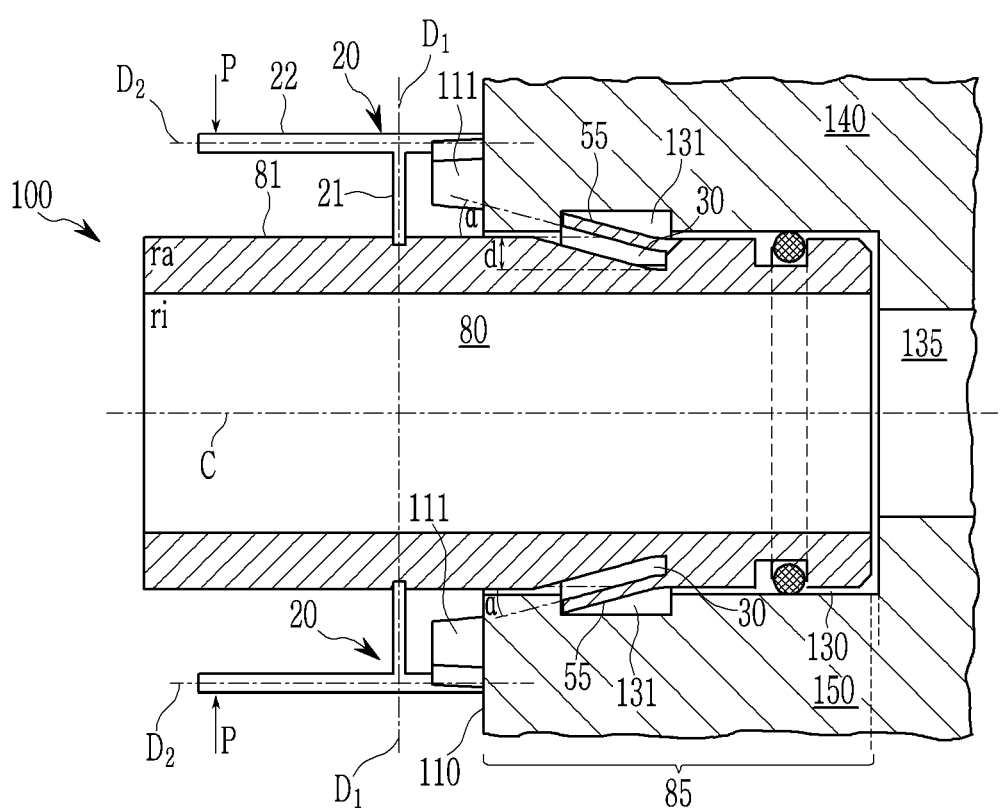
FIG. 5 is a cross-sectional view of the connection system shown in FIG. 4.

FIG. 5 is a cross-sectional view of the connection system 200 in the connected state as shown in FIG. 4. In the connected state, a section 85 of the base part 80 is recepted by (e.g., is received by or accommodated in) the circular fit 130 of the female connector 140. The elastic pins 55 of the male connector 100 engage the corresponding fixation openings 131 of the female connector 140, forming a snap-fit connection. For example, the elastic pins 55, which engage the corresponding fixation openings 131, act as barbs, which block the male connector 100 in a longitudinal direction (e.g., along the length of the base part 80). However, as can be seen in FIG. 3, the fixation openings 131 flatten along the radius of the circular fit 130, allowing the elastic pins 55 to be rotated out of their corresponding fixation openings 131 together with the male connector 100. However, such rotation is restricted or prohibited when the elastic T-shaped clips 20 of the male connector 100 are engaged with the blockers 111 of the female connector 140, such as when the connection system 200 is in the connected state.

The female connector 140 is adapted to release the male connector 100 when each of the elastic T-shaped clips 20 is actuated and the male connector 100 is simultaneously (or concurrently) rotated. Such actuation of the elastic T-shaped clips 20 may be, for example, performed by applying pressure to a distal end of the second arm elements 22 of the elastic T-shaped clips 20, indicated in FIG. 5 by two arrows P. Such actuation causes the second arm elements 22 to be lifted out of the gap 112 between the protrusions 111-1, 111-2 of the blockers 111 and allows the male connector 100 to be rotated, thereby releasing the elastic pins 55 from their corresponding fixation openings 131. When in a rotated position, the male connector 100 is released from the female connector 140 and may be easily pulled out of (e.g., retracted from) the same.

In the illustrated embodiment, the male connector 100 and the female connector 140 may be made of an injection molded plastic. However, the male and female connectors 100, 140 may be made of other suitable materials according to other embodiments of the present invention.

Although exemplary embodiments of the present invention have been described herein, it is understood that the present invention should not be limited to these exemplary embodiments and that various changes and modifications can be made by one ordinary skilled in the art within the spirit and scope of the present invention. Hence, the scope of the present invention shall be determined at least by the technical scope of the accompanying claims and their equivalents.

What is claimed is:

1. A male connector for a cooling pipe, the male connector comprising a hollow cylindrical base having a first end having a chamfered outer circumferential edge and a second end, the base comprising:
   a circumferential notch adjacent to the first end and configured to receive an O-ring;
   an elastic pin integrally formed with and protruding from a surface of the base such that an acute angle formed between the surface of the base and the elastic pin has a vertex pointing toward the first end of the base; and
   an elastic T-shaped clip integrally formed on the surface of the base, the elastic T-shaped clip comprising:

a first arm extending from the base in a direction perpendicular to the axis of the base; and a second arm extending from the first arm in a direction different from the extending direction of the first arm.

2. The male connector of claim 1, wherein the circumferential notch is between the elastic pin and the chamfered outer circumferential edge along a length direction of the base.

3. The male connector of claim 1, wherein the elastic pin is formed by residuum of a cut-out of the base.

4. The male connector of claim 3, wherein the base has an inner radius and an outer radius, and wherein the cut-out of the base has a depth that is less a difference between the outer radius and the inner radius.

5. The male connector of claim 1, wherein the elastic pin has a fin shape.

6. The male connector of claim 1, further comprising a plurality of the elastic pins on opposite sides of the base.

7. The male connector of claim 1, wherein the first arm extends along a first direction that is perpendicular to an axis of the base, and the second arm extends along a second direction that is parallel to the axis of the base.

8. The male connector of claim 1, further comprising a plurality of the elastic T-shaped clips on opposite sides of the base.

9. A connection system for connecting a cooling pipe and a housing, the connection system comprising:

a male connector comprising a hollow cylindrical base having a first end having a chamfered outer circumferential edge and a second end, the base comprising:

a circumferential notch adjacent to the first end and configured to receive an O-ring;

an elastic pin integrally formed with and protruding from a surface of the base such that an acute angle formed between the surface of the base and the elastic pin has a vertex pointing toward the first end of the base; and an elastic T-shaped clip on the surface of the base; and a housing comprising a female connector, the female connector comprising a tube-shaped circular fit having an opening in a surface of the housing that is adapted to receive a section of the base of the male connector, the circular fit comprising a fixation opening adapted to engage the elastic pin of the male connector when the section of the base of the male connector is inserted into the female connector, wherein the surface of the housing is a bearing surface for the elastic T-shaped clip of the male connector and comprises a blocker adapted to engage the elastic T-shaped clip.

10. The connection system of claim 9, wherein the fixation opening of the female connector and the elastic pin of the male connector are adapted to engage each other in a snap-fit connection.

11. The connection system of claim 9, wherein the circular fit comprises a plurality of fixation openings on opposite sides of the circular fit.

12. The connection system of claim 9, wherein the blocker comprises a plurality of protrusions adjacent to one another on the bearing surface and having a gap therebetween, the gap being adapted to receive the elastic T-shaped clip.

13. The connection system of claim 9, wherein the female connector is adapted to release the male connector when the elastic T-shaped clip is actuated and the male connector is concurrently rotated.

* * * * *